United States Patent [19]
Jolliffe

[11] 3,865,441
[45] Feb. 11, 1975

[54] PENETRATING STUD FOR SNOWMOBILES

[76] Inventor: James D. Jolliffe, 2411 Maple Valley, Grand Rapids, Mich. 49508

[22] Filed: Sept. 28, 1973

[21] Appl. No.: 401,867

[52] U.S. Cl. .................................. 305/54, 180/5 R
[51] Int. Cl. ........................................... B62d 55/24
[58] Field of Search............ 305/54, 35 EB; 180/5 R

[56] References Cited
UNITED STATES PATENTS

| 885,205 | 4/1908 | Ulrich | 305/54 |
|---|---|---|---|
| 3,572,851 | 3/1971 | Schuler | 305/54 |
| 3,715,146 | 2/1973 | Robertson | 305/54 |
| 3,765,731 | 10/1973 | Kilbane | 305/54 |

Primary Examiner—Philip Goodman
Attorney, Agent, or Firm—Price, Heneveld, Huizenga & Cooper

[57] ABSTRACT

A penetrating cleat or stud adapted for attachment to the belt member of an endless-belt propelled vehicle such as a snowmobile or the like to improve the traction thereof. The stud includes an elongated, generally rectangular body member adapted for mounting transverse to the direction of travel of the endless-belt. A rear wall of the stud extends outwardly from the plane of the endless belt at an angle and has a pair of wave-shaped spurs formed thereon to engage and dig into the terrain over which the vehicle is driven. Side walls of the stud body also include spur-like members which extend a slightly greater distance than the spurs on the rear wall to prevent side slip of the vehicle.

14 Claims, 6 Drawing Figures

PATENTED FEB 11 1975   3,865,441

PENETRATING STUD FOR SNOWMOBILES

BACKGROUND OF THE INVENTION

In self-propelled vehicles having endless drive belt propulsion means as, for example, a snowmobile, a plurality of stud or cleat members fixed to the belt are used to improve the traction of the vehicle on the terrain by concentrating the weight of the vehicle at a number of small points and the force used to cause penetration of hard surfaces such as ice. Various configurations of such cleats have been proposed and are used throughout the industry, the most common being a channel-shaped cleat fixed to the belt member and adapted to engage the ground upon which it travels. Auxiliary studs are also used to increase the traction of the vehicle and these are generally box-shaped, secured to the cleated belt, and have sharpened points at the corners thereof to penetrate the terrain. When traveling through slush ice, gravel, mud or the like the inner opening of both the studs and the cleats tends to load with ice, mud, or the like rendering the device largely ineffective when it is needed the most. The conventional box-like, pointed auxiliary stud is far from satisfactory in providing traction on this type of surface.

SUMMARY OF THE INVENTION

The present invention overcomes the difficulties of the prior art structures in its provision of a generally elongated rectangular body member having a mounting surface thereon for securement to the endless track of the vehicle. A plurality of walls extend downwardly from the mounting surface and include a rear wall extending transversely to the direction of movement of the belt. The rear wall extends outwardly at an angle from the mounting surface and the belt. The rear wall extends outwardly at an angle from the mounting surface and the belt. The rear wall is somewhat wave-shaped in configuration and has a generally inverted, shaped cut-out in the center portion to form a pair of spaced-apart generally V-shaped chisel-like points or spurs on the wave-shaped backwall. The spurs are adapted to dig in and engage the terrain and because of the elongated surface of the back wall provide a large bearing area against which the unstable surface material such as mud or slush ice can react to provide traction. Thus, the construction of this rear wall significantly improves the traction of the vehicle.

Side walls of the stud are also directed downwardly from the mounting surface perpendicular to the rear wall. The side walls are joined with the back wall and form, at the corners thereof, an additional pair of points or spurs which extend downwardly a slightly greater distance than the spurs on the back wall to increase the side-bite of the stud to prevent sliding on turns and hillsides. The special outwardly slanting wave-shaped back wall provides a self-cleaning action which is operative to prevent the build-up of ice and snow in the stud. The many important objects and advantages of the present invention will become better understood by those skilled in the art with reference to the following specification and drawings illustrating a preferred embodiment thereof.

BRIEF DESCRIPTION OF THE PREFERRED EMBODIMENT

Figure 5:
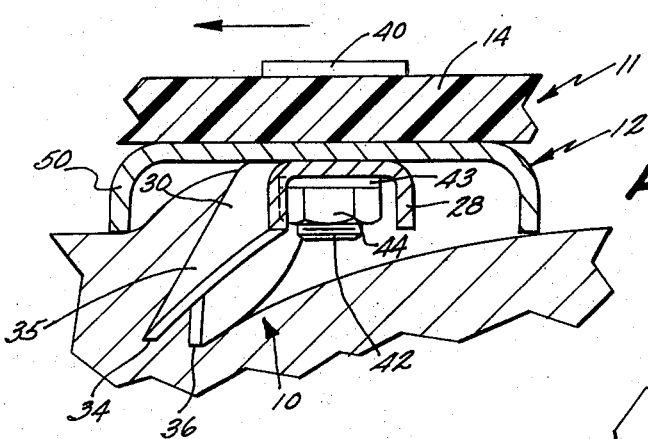
FIG. 5 is a fragmentary, cross-sectional view showing the stud mounted on the endless-belt of a self-propelled vehicle.
Figure 6:
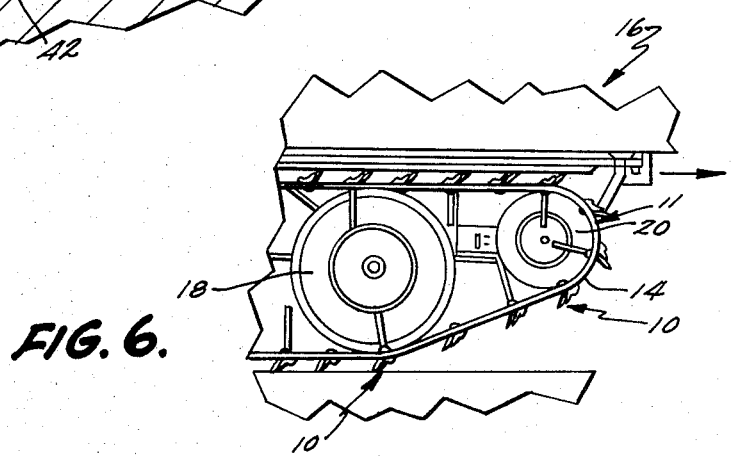
FIG. 6 is a fragmentary view illustrating a plurality of cleats and studs mounted on the endless-belt of a snowmobile.

Referring now to the drawings, the stud generally designated by the numeral 10 is shown in detail in FIGS. 1–5 and is adapted for mounting with a plurality of like studs on the endless-belt 14 within the cleats 12 of a track 11 for a snowmobile or like endless-belt propelled vehicle 16 (FIGS. 5 and 6). As shown in FIG. 6, the belt is supported in a conventional manner on support and guide wheels 18 and 20 mounted on the framework of the vehicle in a conventional manner and connected to suitable driving means (not shown).

The individual studs 10 are generally of inverted V-shape, having a flat, planar top or mounting surface 24 in which a pair of spaced-apart, elongated mounting slots 26 are provided. A plurality of walls depend downwardly from the mounting surface and include a front wall 28, a rear wall 30, and a pair of opposed side walls 32. These walls and the mounting surface are integrally formed from a single piece of metal into a rigid, generally box-like shape. An example of a material from which to manufacture the stud is 14guage 1020 steel, heat treated after forming as by carburizing.

The rear wall 30 is formed to include a pair of spaced-apart rearwardly and downwardly inclined teeth or spurs 39 or chisel-like points 34. The rear wall itself is somewhat wave-shaped along its length having the outermost wave-like portions or crests formed as rearwardly projecting undulations 35, the ends of which form points or spurs 34. A forwardly recessed pocket is formed between the spurs 34. The central portion of the back wall at an innermost portion of the wave shape between crests 35 is cut away in a generally inverted V-shape 38. The spurs are formed at the crest of waves or undulations 35 as a pair of adjacent, rounded V-shapes, the apex of the V forming the spurs. The cut 38 is of such depth that the upper portion of the rear wall remains, thus, leaving a rear wall of substantial depth which extends across the entire width of the stud.

The lower portion of rear wall 30 adjacent the intersection with side walls 32 is similarly cut away as indicated by the numeral 37 (FIGS. 1 and 3) to form a second pair of chisel-like points of spurs 36 generally at the corners where the rear wall and side walls 32 intersect.

Figure 1:
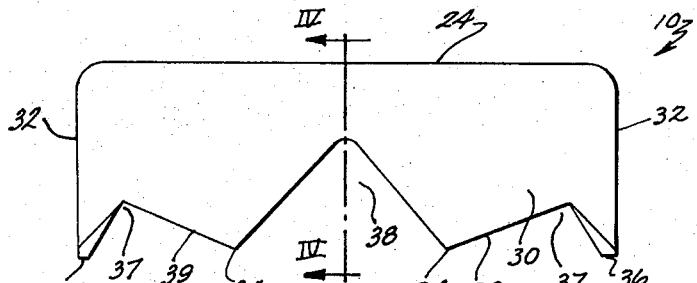
FIG. 1 is a rear view of a stud in accordance with the present invention.
Figure 2:
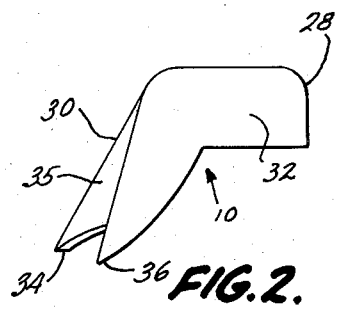
FIG. 2 is a side view of the stud shown in FIG. 1.
Figure 3:
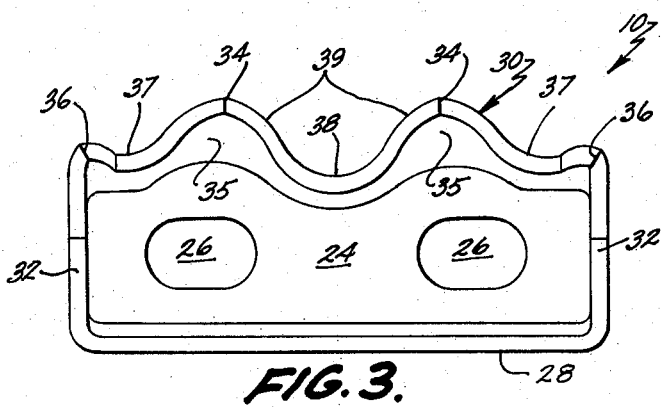
FIG. 3 is a bottom view of the stud shown in FIGS. 1 and 2.
Figure 4:
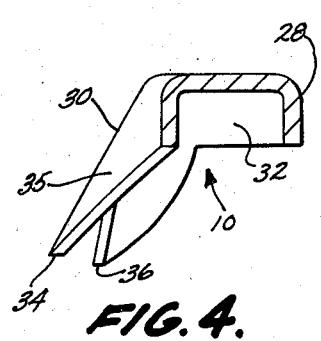
FIG. 4 is a cross-sectional view taken along the plane IV—IV of FIG. 1.

As shown in FIG. 2, the second pair of spurs 36 extend rearwardly from side walls 32 at an angle slightly less than the angle of spurs 34 on rear wall 30. Spurs 36, as measured from mounting surface 32 are slightly greater in length than wave-shaped spurs 34. The second, or outer pair of spurs 36 are also formed somewhat as a V, having an apex shaped to form a chisel-like point at the intersection of the back wall with the side walls.

In FIG. 5, the stud is shown mounted within a cleat 12 of the vehicle track 11 of a snowmobile by means of bolts (only one is shown). The bolts have an enlarged, flat head 40 which seats against the inner face of the endless belt 14. The shank 42 of the bolt extends through belt 14, cleat 12, and through the slotted openings 26 in mounting surface 32 where a lock washer 43 and nut 44 are used to secure the stud in place. Typically, when used on a cleated snowmobile track studs 10 are arranged within the cleats 12 on alternate sides of the vehicle to give extra traction when accelerating and to provide safe turns by preventing side slip. However, any other pattern can be used which will be effective under the circumstances or use.

When the spurs 34 dig-in as shown in FIG. 5, the spurs, because of their wave shape and angular position of back wall 30 with respect to the track, dig into the terrain below and cause a wedging action between its sloping face and a rear wall 50 of cleat track 12. Also the broad faces of the teeth 39 provide a large bearing area for interaction between the teeth and an unstable surface material such as mud or slush. This effect is further reinforced by the fact that the entire upper portion of the rear face of the stud forms an additional bearing area of substantial width and depth. Under severe surface conditions this wedging action of the teeth and the upper bearing area compresses the unstable material until it has sufficient density and stability to provide traction. The result is positive traction not heretofore available with studs.

The side spurs 36 similarly dig into the terrain. The side spurs 36 serve to prevent the studs from attempting to slide sideways as the unstable material is compressed. The fact that the rear face of the stud is wavy or undulating also contributes to this effect. The effectiveness of the side spurs 36 is also important during turns of the vehicle since an important purpose and utility of the side spurs is to dig in and prevent side slip of the vehicle during turns and when operating on hillsides.

The unique configuration of the spur of the present invention because of its integrally formed angular cutting edge digs into the terrain in a manner far superior to that known in the prior art. Because of its hardened steel construction, breakage is not a problem and wear is minimal. The unique wave shape face of the rear wall and the curved V-shape of the spurs gives both a better bite into the terrain and also provides a self-cleaning action as the stud travels with the belt. The elongated configuration of the stud, permitting the use of two mounting bolts prevents rotation of the stud further increasing its effectiveness.

Those skilled in the art will, of course, readily appreciate the many advantages of the present invention over studs of the prior art. Those so skilled will also recognize that modifications may be made and it is intended that the equivalent arrangements be covered unless the following claims by their wording expressly state otherwise.

The embodiments of the invention in which an exclusive property or privilege is claimed are defined as follows:

1. A stud for attachment to the belt member of an endless-belt propelled vehicle to improve the traction thereof comprising:
an elongated body member adapted for mounting transverse to the endless-belt member, said body member being generally rectangular in shape having a top wall, a back wall, and a pair of opposed end walls, said top wall having openings formed therein to accommodate fastening means to secure said body member to said endless-belt member, said back wall extending rearwardly and downwardly at an angle with respect to said top wall, the outermost end of said back wall having a pair of spaced-apart chisel-like spurs projecting from the bottom outer edge thereof to engage a surface therebelow, said spurs being offset rearwardly from the remainder of said back wall, said back wall extending downwardly substantially below the forward portion of said body member whereby said back wall initially supports the major portion of the vehicle weight imposed on said stud to increase its surface penetration capability.

2. The stud as defined in claim 1 wherein said spaced-apart spurs are generally V-shaped with the apex of the V forming said spurs.

3. The stud as defined in claim 1 wherein said end walls adjacent said back wall each have a downwardly projecting chisel-like spur, the broad face of said spurs being generally perpendicular to said back wall to prevent lateral shifting of the vehicle.

4. A stud as defined in claim 3 wherein said spurs on said end walls extend downwardly a distance greater than said spurs on said back wall.

5. The stud as defined in claim 4 wherein said spurs on said back wall, in cross-section, are generally arcuate in shape.

6. A traction device for an endless track-propelled vehicle comprising:
a stud having an elongated, generally rectangular body, said body having a generally flat planar mounting surface and a depending rectangular peripheral wall having rear, side and front portions, the rear portion of said wall being downwardly and rearwardly inclined, and having a pair of spaced downwardly projecting, surface-penetrating spurs, said rear portion of said wall extending substantially below said forward portion thereof.

7. The stud as defined in claim 6 also having a second pair of downwardly projecting spurs at the intersection between said side and rear portions of said wall, said second spurs having their broader faces generally perpendicular to the faces of said spurs on said rear wall.

8. The stud as defined in claim 7 wherein said second spurs extend downwardly from said mounting surface a distance greater than said spurs on said rear wall portion to prevent side slip of the vehicle.

9. The stud as defined in claim 8 wherein said rear wall portion is generally wave-shape in configuration, said spurs being formed at the crest of the wave as a pair of adjacent V-shapes, the apex of said V-shapes forming said first mentioned spaced-apart spurs.

10. A stud as defined in claim 6 wherein said spurs on said rear wall portion are offset rearwardly from the remainder of said rear wall portion forwardly recessed pocket therebetween for entrapping surface material displaced by said spurs.

11. A stud as defined in claim 10 wherein the upper portion of said rear wall portion forms an elongated, uninterrupted surface extending the entire width of said stud and in cooperation with the rear faces of said spurs provides a bearing surface of substantial area for engaging and compressing surface material forced upwardly by said spurs.

12. A stud as defined in claim 11 wherein a pair of side spurs are provided one on each side of said stud, said side spurs extending downwardly and having a chisel-like point at their ends.

13. A stud as defined in claim 12 wherein said side spurs are longer than said spurs on said rear wall portion.

14. In combination, an endless surface engaging belt for vehicle propulsion, a plurality of cleats mounted cross-wise on said belt, said cleats being of generally inverted U-shape, a plurality of studs, each of said studs being mounted in one of said cleats, the back of said studs having an elongated, generally rectangular body, said body having a generally flat upper surface seated against the lower face of a cleat and a downwardly and rearwardly inclined rear wall;

said wall having a pair of downwardly and rearwardly inclined surface penetrating spurs, said spurs being spaced lengthwise of said stud and offset rearwardly from the remainder of said wall and forming a forwardly recessed pocket therebetween for entrapping surface material displaced by said spurs;

the upper portion of said wall forming an elongated uninterrupted surface extending the entire width of said stud and in cooperation with the rear faces of said spurs providing a bearing surface of substantial area for engaging and compressing surface material forced upwardly by said spurs;

means for securing each of said studs to one of said cleats with the longer dimension of the stud generally parallel to the long axis of the cleat;

said means holding said stud against rotation.

* * * * *

UNITED STATES PATENT OFFICE
CERTIFICATE OF CORRECTION

PATENT NO. : 3,865,441
DATED : February 11, 1975
INVENTOR(S) : James D. Joliffe

It is certified that error appears in the above-identified patent and that said Letters Patent are hereby corrected as shown below:

Column 4, Line 61:

After "portion" insert -- forming a --

Signed and sealed this 17th day of June 1975.

(SEAL)
Attest:

RUTH C. MASON
Attesting Officer

C. MARSHALL DANN
Commissioner of Patents
and Trademarks